United States Patent [19]

Ono

[11] Patent Number: 4,473,898
[45] Date of Patent: Sep. 25, 1984

[54] DEVICE AND METHOD FOR CONTROLLING A PICKUP ARM OF AN AUTOMATIC RECORD PLAYER

[75] Inventor: Tsuyoshi Ono, Yamato, Japan

[73] Assignee: Victor Company of Japan, Limited, Yokohama, Japan

[21] Appl. No.: 436,717

[22] Filed: Oct. 26, 1982

[30] Foreign Application Priority Data

Oct. 27, 1981 [JP] Japan ................................ 56-171870

[51] Int. Cl.$^3$ ............................ G11B 3/08; G11B 3/34
[52] U.S. Cl. ..................................... 369/221; 369/215; 369/244
[58] Field of Search ............... 369/215, 216, 217, 220, 369/221, 222, 223, 244

[56] References Cited

U.S. PATENT DOCUMENTS

| 4,142,729 | 3/1979 | McLennan | 369/215 |
| 4,214,756 | 7/1980 | Ohmura | 369/215 |
| 4,230,323 | 10/1980 | Tsuji et al. | 369/221 |
| 4,342,108 | 7/1982 | Kitamura et al. | 369/221 |

Primary Examiner—Steven L. Stephan
Attorney, Agent, or Firm—Lowe, King, Price & Becker

[57] ABSTRACT

A pulse generator associated with a pickup arm drive motor produces a pulse train signal as the pickup arm moves inward and outward with respect to the turntable, and the number of the pulses is counted to detect the position of the pickup arm. In order to remove undesirable influence due to overshoot of the pickup arm caused by inertia of the pickup drive system, the number of the pulses is continuously counted by a counter within a microcomputer for a predetermined period of time after deenergization of the pickup arm drive motor so that the number of the pulses indicates the actual position of the pickup arm. In one embodiment, each pulse is detected by recognizing the rising edge when the pickup arm is moved in one direction, and each pulse is detected by recognizing the falling edge when the pickup arm is moved in the other direction.

8 Claims, 24 Drawing Figures

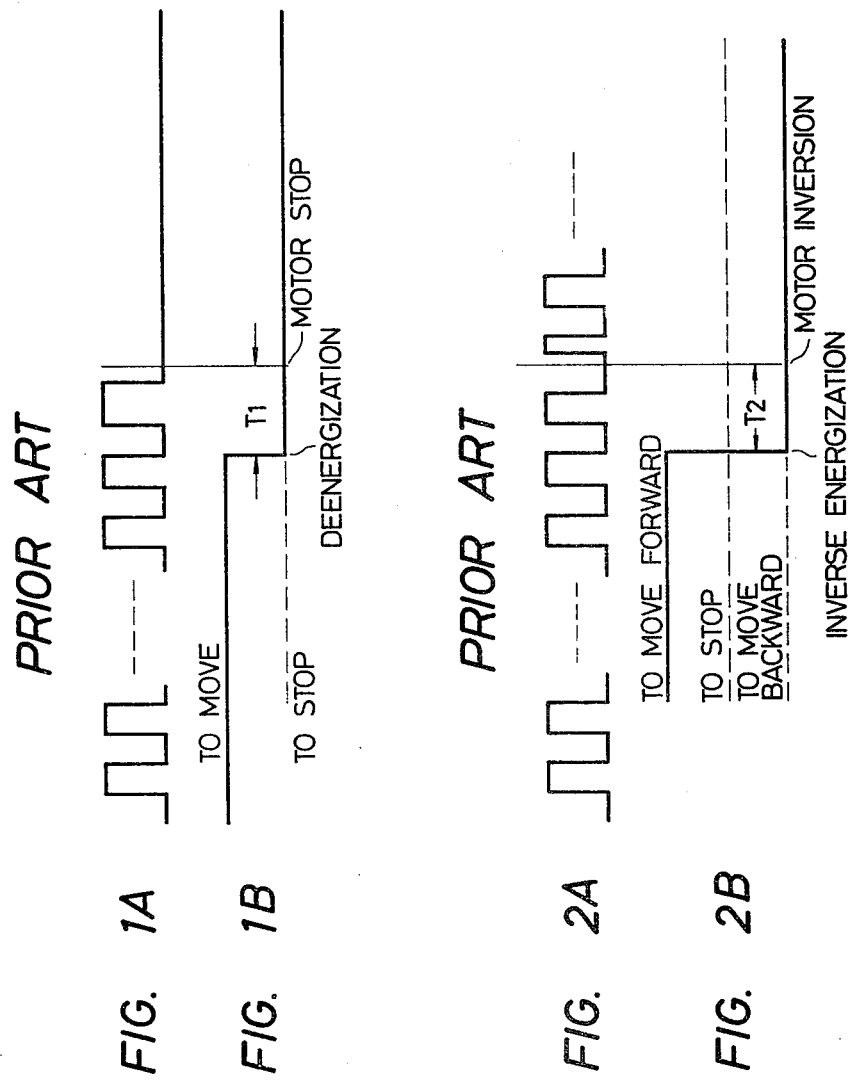

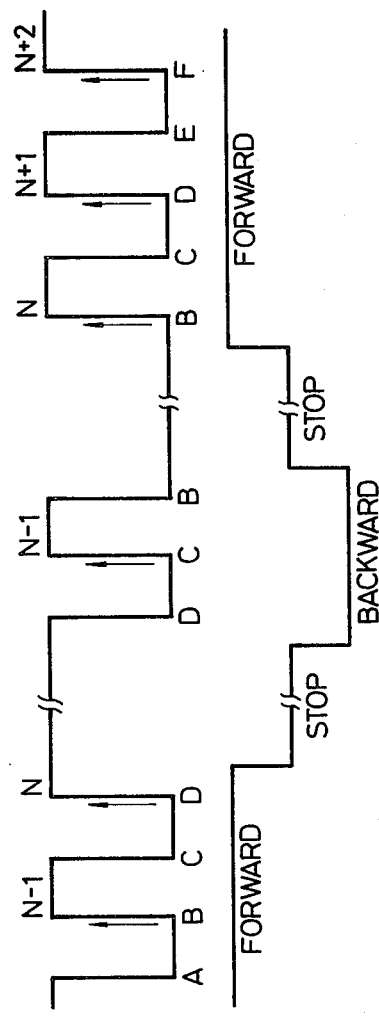
FIG. 3A PRIOR ART
FIG. 3B
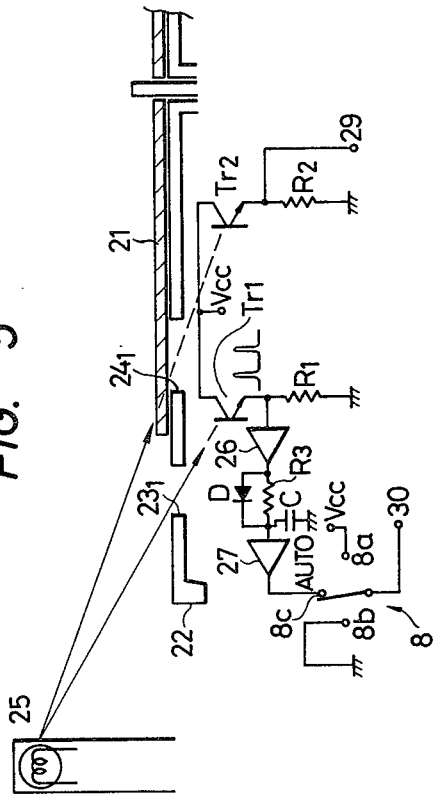
FIG. 5

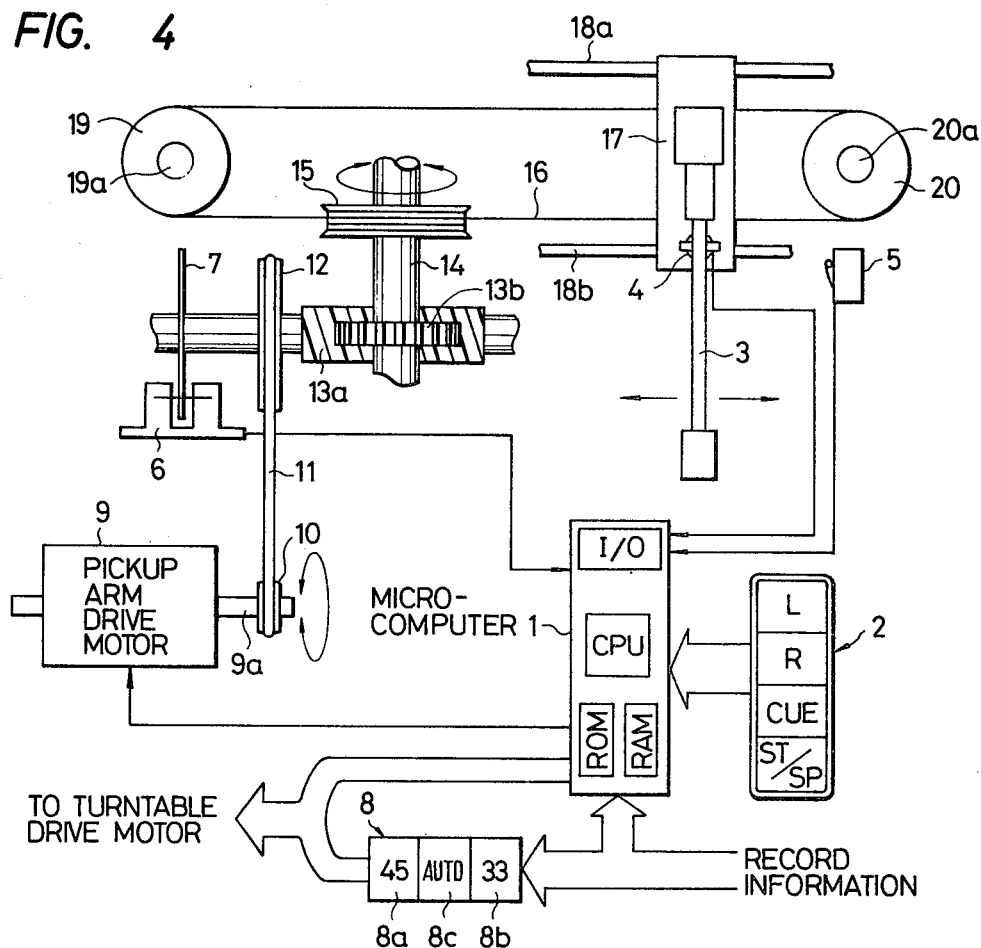
FIG. 4
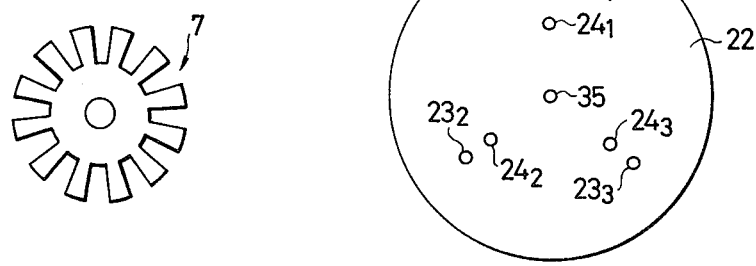
FIG. 6
FIG. 7

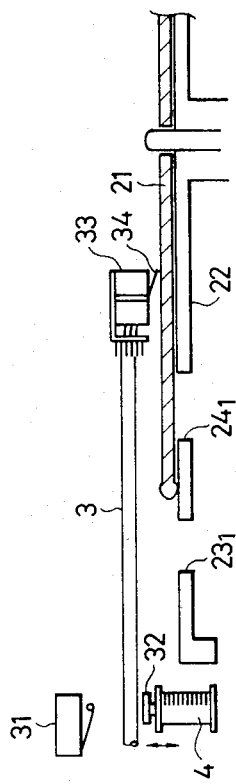
FIG. 8
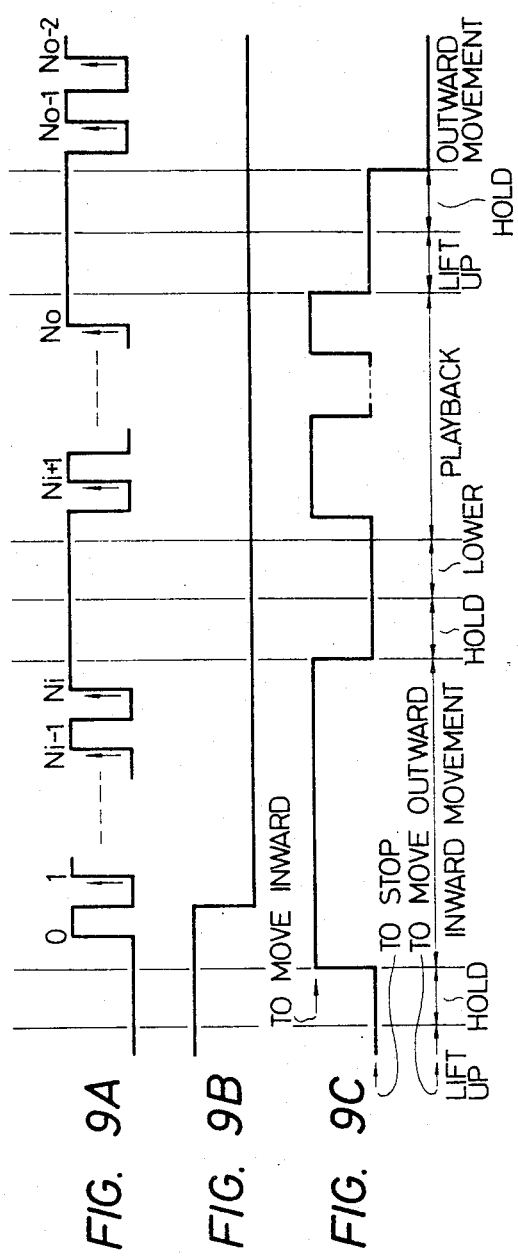
FIG. 9A
FIG. 9B
FIG. 9C

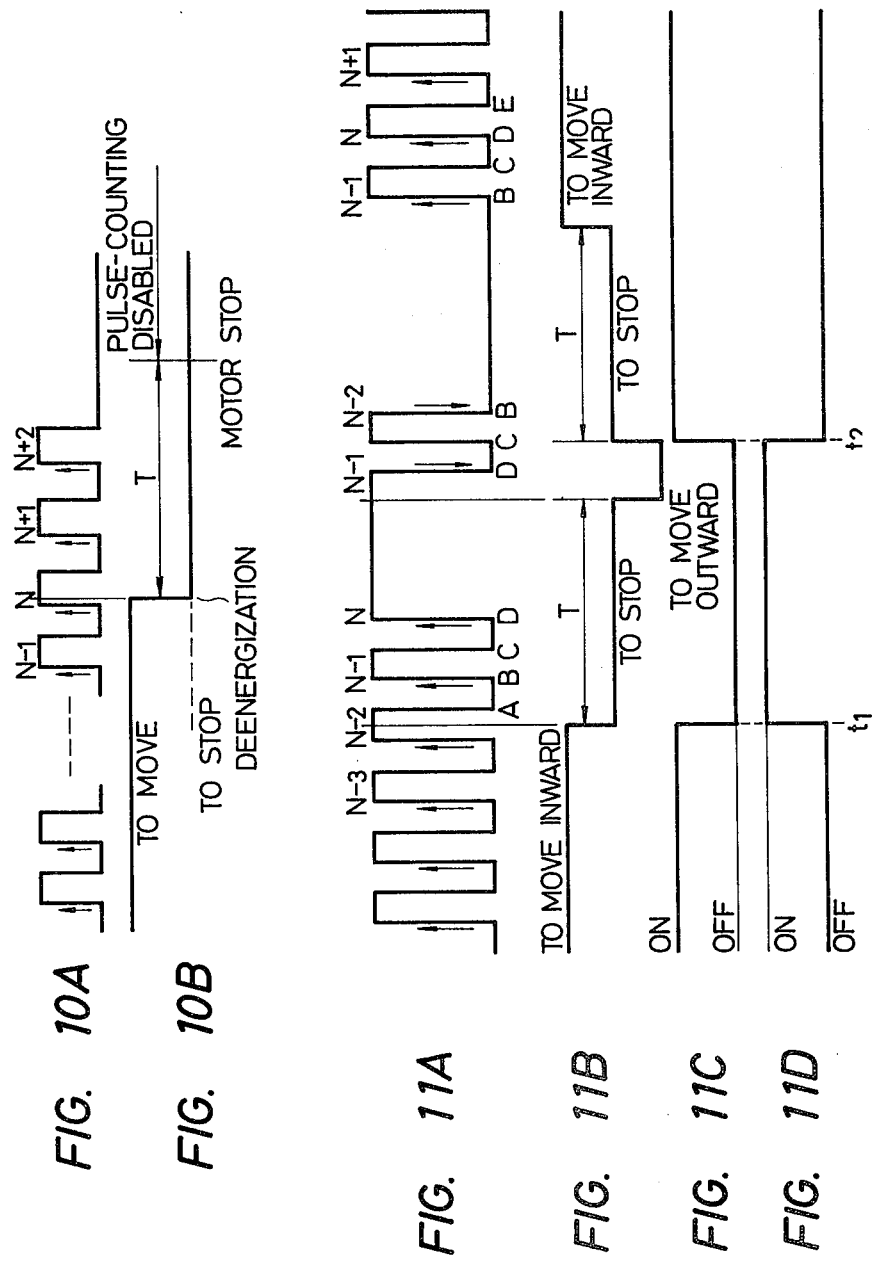

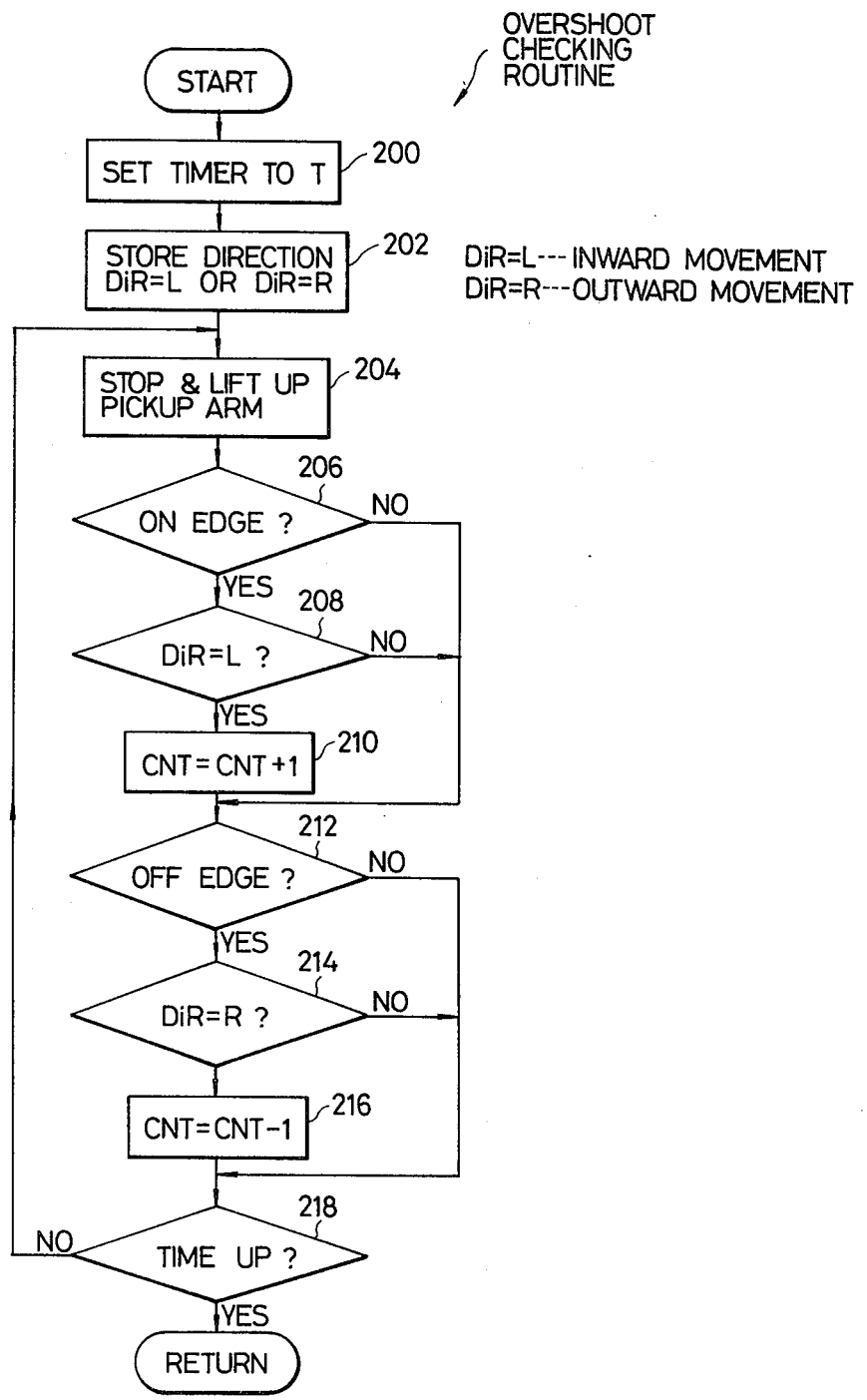

DEVICE AND METHOD FOR CONTROLLING A PICKUP ARM OF AN AUTOMATIC RECORD PLAYER

BACKGROUND OF THE INVENTION

This invention relates generally to a phonograph record player, and more particularly, the present invention relates to a pickup arm control device used in an automatic record player.

In conventional automatic record players, the position of the pickup arm is detected to control the movement of the pickup arm so that the pickup arm is automatically moved to cause the reproduce stylus to be placed on a desired position on a phonograph record, and to cause the same to depart from the record when playback is completed. As a conventional device for controlling the pickup arm of a record player is known a pulse-count system in which the number of pulses corresponding to the moving amount or distance of the pickup arm is counted to detect the position of the pickup arm. In such a system, when it is detected that a lead-in position on a disc record is reached, the reproduce stylus is automatically engaged with the sound groove on the disc record, and when it is detected that a lead out position on the disc record is reached, the reproduce stylus is disengaged from the sound groove so as to move the pickup arm to the arm rest or a head position of a program to be reapeatedly reproduced. In such a record player, inertia of the pickup arm drive motor and encoder necessarily exists. Due to this inertia, the pickup arm does not stop at an instant when a stop command signal is fed to the pickup arm drive motor. In other words, the pickup arm overruns. However, the number of pulses produced from the encoder is counted for a time interval that the pickup drive motor is energized, and this results in miscounting because some pulses generated after the pickup drive motor is deenergized are not counted. As a result, the count which should indicate the positon of the pickup arm does not accurately indicate the actual pickup arm position. When such miscounting occurs, automatic control of the pickup arm is disturbed resulting in undesired movement of the pickup arm as will be described later in detail.

SUMMARY OF THE INVENTION

The present invention has been developed in order to remove the above-described drawback inherent to the conventional record players.

It is, therefore, an object of the present invention to provide a device for controlling a pickup arm of a record player so that the position of the pickup arm is accurately detected irrespective of the inertia of the pickup arm drive system, resulting in accurate control of the pickup arm.

According to a feature of the present invention it is possible to accurately detect the actual position of the pickup arm without using expensive parts or auxialiary circuits so that it is possible to perform positioning control without malfunction. To this end, when positioning control in connection with lead-in and lead-out is effected by counting the number of pulses corresponding to the movement amount of the pickup arm, the pulses are continuously counted for a predetermined period of time after a movement stop command signal or a moving direction inverting command signal is sent, and the pulses are regarded as pulses indicating the same moving direction as the moving direction of the pickup arm at the time before the command signal is sent.

In accordance with the present invention there is provided a pickup arm control device for a record player comprising: a pickup drive motor for moving a pickup arm of the record player in inward and outward directions with respect to a turntable of the record player; first means for producing a pulse train signal indicative of the moving amount of the pickup arm; and second means for energizing the pickup arm drive motor in response to a first command signal, the rotating direction of the pickup arm drive motor being determined by the polarity of the first command signal; for detecting the moving direction of the pickup arm from the polarity of the first command signal; for counting the number of the pulses in such a manner that additive counting is effected when the pickup arm is moving in a given direction and subtractive counting is effected when the pickup arm is moving in a direction opposite to the given direction; for detecting a second command signal, with which the pickup arm drive motor is to be stopped or inversely rotated; for deenergizing the pickup drive motor in response to the second command signal; and for continuously counting the number of the pulses for a predetermined period of time after the instant, at which the pickup arm drive motor is deenergized, in the same direction as before.

In accordance with the present invention there is also provided a method of controlling a pickup arm of a record player comprising the steps of: producing a pulse train signal indicative of the moving amount of the pickup arm which is arranged to move in inward and outward directions with respect to a turntable of the record player by means of a pickup drive motor; energizing the pickup arm drive motor in response to a first command signal, the rotating direction of the pickup arm drive motor being determined by the polarity of the first command signal; detecting the moving direction of the pickup arm from the polarity of the first command signal; counting the number of the pulses in such a manner that additive counting is effected when the pickup arm is moving in a given direction and subtractive counting is effected when the pickup arm is moving in a direction opposite to the given direction; detecting a second command signal, with which the pickup arm drive motor is to be stopped or inversely rotated; deenergizing the pickup drive motor in response to the second command signal; and continuously counting the number of the pulses for a predetermined period of time after the instant, at which the pickup arm drive motor is deenergized, in the same direction as before.

BRIEF DESCRIPTION OF THE DRAWINGS

The object and features of the present invention will become more readily apparent from the following detailed description of the preferred embodiments taken in conjunction with the accompanying drawings in which:

FIGS. 1A and 1B, FIGS. 2A and 2B, and FIGS. 3A and 3B are diagrams showing examples of pickup movement detection pulses and a control signal fed to a pickup arm moving motor in a conventional record player;

FIG. 4 is a schematic diagram showing an embodiment of a record player according to the present invention;

FIG. 5 is a diagram showing an example of a record size and record presence/absence detecting circuit which supplies the microcomputer showing in FIG. 4 with record information;

FIG. 6 is a front elevation showing an example of the disc-shaped plate shown in FIG. 4;

FIG. 7 is a diagram showing an example of the turntable shown in FIGS. 5 and 8;

FIG. 8 is a diagram showing an embodiment of the positional relationship between the pickup arm and the rising detection microswitch in the record player according to the present invention;

FIGS. 9A, 9B and 9C are waveform charts showing the operation of the embodiment of FIG. 4;

FIGS. 10A and 10B are waveform charts showing an example of the relationship between the movement detection pulses at the time of manipulation for stopping and the control signal of the pickup arm moving motor in the record player according to the present invention;

FIGS. 11 A-D are an explanatory waveform chart for an embodiment in connection with the time of manipulation for inversion in the record player according to the present invention;

FIG. 15 is a flowchart showing a sub routine included in the main routine of FIG. 14.

The same or corresponding elements and parts are designated at like reference numerals throughout the drawings.

DETAILED DESCRIPTION OF THE INVENTION

Figure 12:
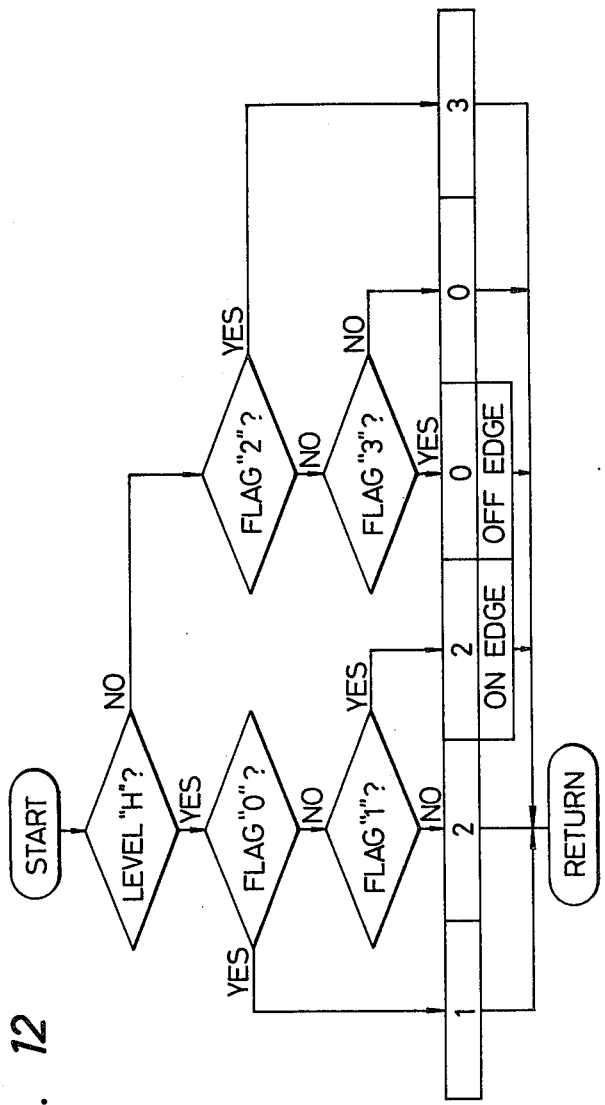
FIG. 12 is a flowchart for the description of an embodiment of a method of detecting the edge of the movement detection pulses in the record player according to the present invention.

Prior to describing the preferred embodiment of the present invention, the above-mentioned conventional record player will be discussed with reference to FIGS. 1A, 1B, 2A, 2B, 3A and 3B for a better understanding of the present invention.

Assuming that a pickup arm of a record player is arranged to change its position by being driven by a pickup arm drive motor and en encoder is associated with the pickup arm drive motor is provided to produce a pulse train signal indicative of the position of the pickup arm, the number of the pulses are counted by a counter. However, the inertia of the pickup arm drive system cannot be ignored as described in the above, and this results in overshoot or overrun of the pickup arm. For instance as shown in FIG. 1B, when a rotation stop command signal is sent to the pickup arm drive motor at the time of moving the pickup arm in a given direction, the motor does not immediately stop due to the above-mentioned inertia, and therefore stops after a predetermined period of time $T_1$ (such as several milliseconds to several tens of milliseconds). As a result, pulses are generated for the above-mentioned period $T_1$ from a pulse encoder attached to the rotary shaft of the motor. However, since counting by the counter is stopped at the time of generation of the above-mentioned rotation stop command signal, overshoot (overrun) during the above-mentioned period $T_1$ cannot be detected.

In the case that the pickup arm is being moved in a forward direction with the forward rotation of the pickup arm drive motor (namely in the case of forward feeding) as shown in FIG. 2B, if a moving direction inversion command signal is sent for moving the pickup arm in a reverse direction, the pickup drive motor does not immediately rotate in the reverse direction due to inertia, and thus starts rotating inversely after a period $T_2$. However, since the counting direction of the counter which counts the number of pulses from the encoder at the same time of generation of the above-mentioned moving direction inverting command signal, the pulses from the encoder are counted as pulses indicative of reverse feeding although the pulses actually indicate forward feeding, resulting in double miscount. In this way the conventional record players have suffered from the drawbacks that the pickup arm is lifted up during playback; the pickup arm is not lifted up at the lead-out position or the like due to positional error for the lead-out position caused by miscounting in the above-mentioned period $T_1$ or $T_2$.

Therefore, it is necessary to prevent miscounting due to the above-mentioned overshoot (overrun), and it is possible to provide the following techniques: (1) Overshoot is made extremely small by controlling the velocity of the pickup arm drive motor. (2) Overshoot is made small by using a pickup arm drive motor having small inertia, for instance, coreless motors or the like. (3) The counting direction of the counter is matched with an actual condition by detecting the actual rotational direction of the pickup arm drive motor. (4) The moving amount of the pickup arm per one pulse from the encoder is made small so that slight miscount does not result in problems in practical use. However, the above-mentioned techniques (1) and (3) suffer from problems of D.C. drift due to temperature and secular change in a servo system and a level detecting circuit, and thus adjustment is required, and the technique (4) requires a high-speed element (for instance, a microcomputer) for counting high-frequency pulses, and therefore it is difficult to increase the velocity of the pickup arm. Furthermore, the techniques (1), (2) and (4) have a drawback that they do not provide fundamental improvement, and there are some problems in practical use, while these techniques provide eventually cost increase.

Even if the moving direction of the pickup arm and the counting direction of the pulses are matched with each other, since counting is effected with the front edge or rear edge of each pulse derived in accordance with rotation of the pickup arm drive motor in the conventional record player of pulse-count system, in the case that the pickup arm is controlled to move as forward feed→stop→reverse feed→stop→forward feed as shown in FIG. 4B, a falling edge appearing immediately after changing from stop to reverse feed is not counted assuming that the counter, which counts the number of pulses derived from the encoder in accordance with the moving control of the pickup arm as shown in FIG. 4A, is arranged to count the rising edge, thereby resulting in miscounting. Namely, in FIG. 3A, the values above the waveform indicate the counts of the counter; alphabets below the waveform indicate the edges of pulses from the encoder; and the counts are $N-1$, $N$ in response to edges B, D on first forward feed, whereas the counts are $N$, $N+1$ in response to the edges B, C on a second forward feed. This means that the count changes although the count should be identical for the same edge.

The present invention has been achieved to remove the above-mentioned various drawbacks, and one embodiment of the present invenion will be described hereafter.

FIG. 4 is a schematic diagram showing an embodiment of the device according to the present invention. Since the present invention has a feature in the way of counting the number of pulses from an encoder, the mechanical structure per se in FIG. 4 is the same as in conventional one. In FIG. 4, a microcomputer 1 is supplied with a key input signal from a key switch 2, arm vertical control signal obtained from a plunger 4 for lifting up and lowering a pickup arm 3, a signal from a rest switch 5 which turns on when the pickup arm 3 is at the position of the arm rest, a pickup arm movement detection pulse signal from a light-receiving element in a photoelectric detector having a light path in which a portion of a disc-shaped plate 7 is positioned, and a record size information signal from a record size and recording presence/absence detecting circuit having a structure shown in FIG. 5, and outputs a signal as a drive control signal for the pickup arm moving motor 9 on the basis of these signals, and further outputs a drive control signal as well as a signal from a rotational speed setting switch 8 to a turntable drive motor (not shown). The amount of movement of the pickup arm 3 is detected from the count which is obtained by counting the number of pickup arm movement detection pulses (which are also referred to as movement detection pulses) from a pulse encoder comprising the photoelectric detector 6 and the disk-shaped plate 7, by the microcomputer 1.

In FIG. 4, switches indicated at (L) and (R) in the key switch 2 are switches for moving the pickup arm to the left (for instance, forward direction) and to the right (for instance, reverse direction) with the reproduce stylus held at a predetermined height from the disc record. The reference (CUE) is a switch for stopping the movement of the pickup arm 3 to keep the reproduce stylus apart from disc record and to interrupt playback when depressed during playback, and for engaging the reproduce stylus with the disc record to restart playback when depressed during interruption. The references ST/SP is a switch to be depressed at the beginning or end of playback. The disc-shaped plate 7 has equidistantly formed teeth as shown in a front view of FIG. 6, and is arranged to block the light path extending from a light-emitting element to the light-receiving element of the photoelectric detector 6 by its toothed portions and to form a light path by the spaces between adjacent toothed portions.

The above-mentioned toothed disc or gear 7 is coaxially fixed to one end of a rotary shaft having a first gear 13a whose center portion constitutes a worm gear, while a pulley 12 is coaxially fixed to the rotary shaft. Since a belt 11 is tensed between the pulley 12 and another pulley 10 coaxially and integrally provided to a rotary shaft 9a of a motor 9, the rotational force of the motor 9 is transmitted via the pulley 10 and the belt 11 to the pulley 12 so that the disc-shaped plate 7 and the first gear 13a respectively rotate together with the pulley 12. Accordingly, the light from the light-emitting element of the photoelectric detector 6 is intermittently blocked by the toothed portions of the disc-shaped plate 7 due to the rotation of the motor 9 in a well known manner, and therefore, the light-receiving element generates and outputs pulses having a repetition frequency corresponding to the rotational speed of the motor 9, and these pulses are fed to the microcomputer 1 as the pickup arm movement detection pulses.

On the other hand, the first gear 13a engages with a second gear 13b, which is a spur gear constituting the worm gear. The second gear 13b is coaxially fixed to one end of a rotary shaft 14, to the other end of which is coaxilly and integrally fixed a pulley 15. A wire 16 is wound around the pulley 15. One end of the wire 16 is fixed to a pickup arm supporting mount 17, and the wire 16 is wound around the pulley 15 so that the other end of the same is fixed to the pickup arm supporting mount 17 via the pulleys 19 and 20. The pulleys 19 and 20 are provided to face each other in a direction of the movement of the pickup arm supporting mount 17, and are arranged to rotate centering shafts 19a and 20a. Therefore, rotation of the motor 9 is transmitted to the pulley 15 to rotate the same after speed reduction by the worm gear, so that the wire 16 is reeled up or rewound causing the pickup arm 3 and its supporting mount 17 to move along guide rails 18a and 18b to the left or right in the drawing (i.e. inwardly and outwardly with respect to a disc record to be played back) at a velocity corresponding to the rotational speed of the motor 9.

The rotational speed setting switch 8 is used not only for selecting a desired rotational speed of the turntable but also for indicating the selected rotational speed, and comprises a switching portion 8a for indicating 45 rpm, a switching portion for indicating 33⅓ rpm, and a switching portion 8c for automatically setting a rotational speed with which the rotational speed is automatically set by detecting the record size and the presence or absence of a record. Namely, when the switching portion 8c is depressed, a record size and record presence/absence detecting circuit shown in FIG. 5 is actuated to detect the presence of a record on the turntable and the size of the disc record. In FIG. 5, the rotational speed setting switch 8 is shown as a rotary switch for simplicity, where the switching portions 8a, 8b and 8c are shown as stationary contacts of the rotary switch. In FIG. 5, the reference 21 is a disc record placed on a turntable 22. In the turntable 22, are made through-holes $23_1$ to $23_3$ and $24_1$ to $24_3$ equidistantly as shown in a plan view of FIG. 7, where the holes $23_1$ to $23_3$ are provided on a circle whose diameter is smaller than 30 cm but greater than 25 cm, and the holes $24_1$ to $24_3$ are provided on a circle whose diameter is smaller than 17 cm. The reference 35 is a center spindle of the turntable 22. Therefore, the record disc 21 shown in FIG. 5 is an EP record of 17 cm diameter for instance.

The references Tr1 and TR2 are respectively phototransistors, where Tr1 receives light from a light-emitting element 25 via the hole $23_1$ (or $23_2$, $23_3$), and Tr2 receives this light via the hole $24_1$ (or $24_2$, $24_3$). When no record disc is placed on the turntable 22, both the phototransistors Tr1 and Tr2 turn on in receipt of the light from the light-emitting element 25, and therefore, a high level record nondetection signal is sent from a junction between the emitter of the phototransistor Tr2 and a resistor $R_2$ via an output terminal 29 to the microcomputer 1 shown in FIG. 4. On the other hand, when a record disc having a diameter of 17 cm is placed on the turntable as shown in FIG. 5, the phototransistor Tr2 turns off because the light to be received by the phototransistor Tr2 is blocked by the record disc 21, and the emitter output thereof is rendered low, while the other phototransistor Tr1 turns on because it receives the light via the hole $23_1$ (or $23_2$, $23_3$). Under this condition, if the turntable 22 starts rotating, the light to be received by the phototransistor Tr1 is intermittently received via the holes $23_1$ to $23_3$ by the phototransistor Tr1, resulting in intermittent on state of the phototransistor Tr1. As a result, a pulse signal is derived from a junction between the emitter of the same and a resistor $R_1$. This pulse is fed to an amplifier 26 to be amplified therein. And the output signal of the amplifier 26 is fed to a rectifying and smoothing circuit comprising a resistor $R_3$, a capacitor C and a diode D to be converted into a given D.C. voltage. This D.C. voltage is fed via an amplifier 27 and the terminal portion 8c of the switch 8 to the turntable rotating motor (not shown) as a rotational speed indication signal with which the rotational speed is set to 45 rpm, from an output terminal. The D.C. voltage from the terminal 8c is also fed to the microcomputer 1 as a record size detection signal indicating that the record size is 17 cm. However, if desired, the pulse signal developed at the junction between the emitter of the phototransistor Tr1 and the resistor $R_1$ may be directly fed to the microcomputer 1 as the record size detection signal. In the case that a disc record having a diameter of 30 cm is placed, both the phototransistors Tr1 and Tr2 are put in off state, and therefore, a low level record presence signal is output to the output terminal 29, while a low level record size detection signal indicative of 30 cm is fed to the microcomputer 1, as a rotational speed selection signal with which the rotational speed will be set to $33\frac{1}{3}$ rpm. The above arrangement has been designed in view of the fact that most records of 30 cm are to be rotated at $33\frac{1}{3}$ rpm, while most records of 17 cm are to be rotated at 45 rpm. However, in exceptional cases the switching portion 8a or 8c of the switch 8 of FIG. 4 may be manipulated to manually set the rotational speed of the turntable 22.

Furthermore, the fact that the pickup arm 3 is in a lifted position is detected by a microswitch 31 shown in FIG. 8. Namely, in FIG. 8, although a stylus 34 of a cartridge 33 provided to the tip portion of the pickup arm 3 engages with the disc record 21 during playback so that the microswitch 31 is in off state, when the pickup arm 3 is lifted up to a given height by being supported by a supporting member 32 of a plunger 4, the microswitch 31 turns on because the pickup arm 3 presses an actuator portion of the microswitch 31. A lift up detection signal from the microswitch 31 is supplied to the above-mentioned microcomputer 1.

In the above-described record player of pulse-count system, when playback of a disc record is started, the motor 9 starts rotating so that the light-receiving element of the photoelectric detector 6 starts producing movement detection pulses as shown in FIG. 9A, while the waveform of the output signal from the rest switch 5 shows a low level as shown in FIG. 9B. When the number of the movement detection pulses reaches Ni, the movement of the pickup arm 3 is stopped because the pickup arm 3 is considered to be moved so that the reproduce stylus is at the lead-in position. Then the pickup arm 3 is lowered to start playback. After playback when the number of the movement detection pulses equals No, it is regarded that the pickup arm 3 has come to the lead-out position, and thus the pickup arm 3 is lifted up and is moved outward for rejection or repeat operation. In this manner, operations such as shown in FIG. 9C are automatically performed. In the above, it is a matter of course that the values of the above-mentioned Ni and No may be changed and set automatically in accordance with the size of the record.

In the above-described record player the number of the movement detection pulses are counted with each rising or falling edge being recognized. In the case that the pickup arm 3 is put in stop condition (cue up), counting is stopped for preventing miscounting due to noises. In the case that the pickup arm 3 is moved to a desired position by moving the pickup arm 3 inward or outward with the switching portions L and R of the key switch shown in FIG. 4, counting is effected in a given counting direction (subtracting counting or adding counting) corresponding to the direction of the movement of the pickup arm 3, to detect the position of the pickup arm 3 all the time.

According to the present invention as shown in FIG. 10B, when a control or command signal is fed to the motor 9 to stop the pickup arm 3 during inward or outward movement of the pickup arm 3, the movement detection pulses such as shown in FIG. 10A, which are derived from the light-receiving element of the photoelectric detector 6 for a short period of time after the manipulation for stopping due to inertia etc of the motor 9, are continuously counted for a predetermined period of time T after the manipulation for stopping, by the microcomputer 1 as the pulses of the same moving direction as just before. The above-mentioned predetermined period of time T is selected to a value which is slightly longer than an outputting period of time of the movement detection pulses produced after manipulation for stopping, and therefore, when overshoot occurs after manipulation for stopping, a count of the number of the movement detection pulses, corresponding to the overshoot can be obtained, while miscounting due to noises can be prevented.

The moving direction of the pickup arm 3 is detected from the polarity of the control signal fed to the pickup arm drive motor 9. Namely, an unshown register in the CPU of the microcomputer 1 is set to one of two values to indicate the polarity of the control signal.

On the other hand, it will be described in connection with a case that the pickup arm is to be moved in a direciton opposite to a given moving direction of the same when the pickup arm is moving in the given moving direction. For simplicity it is supposed that when the inward feed switch L is in on state as shown in FIG. 11C, the outward feed switch R is turned on at time $t_1$ and simultaneously the inward feed switch L is turned off as shown in FIG. 11D, and then the inward feed switch L is turned on at time $t_2$ after a period of time longer than the above-mentioned predetermined period of time T, and simultaneously the outward feed switch R is turned off. In this case, the microcomputer 1 does not immediately inverse the rotational direction of the motor 9, but sends a stop signal from the microcomputer 1 to the motor 9 for a predetermined period of time T so as to absorb the moving direction at the time immediately before the inversion of the moving direction, and then outputs a signal for inverting the moving direction. Therefore, the motor 9 is necessarily supplied with the stop signal for the predetermined period of time T after the time $t_1$ and for the predetermined period of time T after the time $t_2$. Since smooth movement of the pickup arm 3 following the operator's would be disturbed if the predetermined period of time T were too long, and since it is impossible to absorb the overshoot if it is too short, failing to achieve the original object, it is necessary to determine it by well considering the variations in the amounts of overshoot. In this embodiment, a value between several milliseconds and several tens of milliseconds is adopted.

The movement detection pulses shown in FIG. 11A are counted as movement detection pulses of the same moving direction as that of just before stopping during the above-mentioned predetermined period of time T, while the counting direction is changed and different edges are detected depending on the moving direction. For instance, the movement detection pulses during inward feed are additively counted at the rising edges as shown by arrows in FIG. 11A, and the movement detection pulses during outward feed are subtractively counted at the falling edges. In FIG. 11A, the values above the waveform indicate the count of the counter within the microcomputer 1, while alphabets below the waveform indicate the edges of the disc-shaped plate 7. Therefore, the edges of the disc-shaped plate 7 show a constant count for both inward feed and outward feed within a time period of one revolution, so that it is possible to obtain a count corresponding to an actually moved position of the pickup arm 3 (for instance, the count is N−1 for the edge B and the count is N for the edge D as shown in FIG. 11A).

Furthermore in the present embodiment, the way of detecting the rising edge and falling edge of the above-mentioned movement detection pulses is arranged such that it is detected as an on edge (rising edge) when two consecutive high levels are recognized, and as an off edge (falling edge) when two consecutive low levels are recognized. FIG. 12 shows a flowchart for processing the movement detection pulses in the above-described manner. Namely, first of all, it is detected whether the level of the movement detection pulse is of high level or low level, and it is detected whether the value (flag) of a register is "0" or not when high level is detected. If this is "0", the flag is set to "1", and when this is not "0", it is detected whether the flag is "1" or not. If the flag is not "1", the flag is set to "2", and on the other hand, if the flag is "1", the flag is set to "2" and simultaneously it is regarded as on edge (rising edge). On the other hand, when the movement detection pulse is of low level, it is detected whether the flag is "2" or not, and if the flag is "2", it is set to "3", and if the flag is not "2", it is detected if the flag is "3" or not. Then if the flag is not "3", it is set to "0", and if the flag is "3", it is set to "0" and simultaneously it is regarded as an off edge (falling edge).

Figure 13:
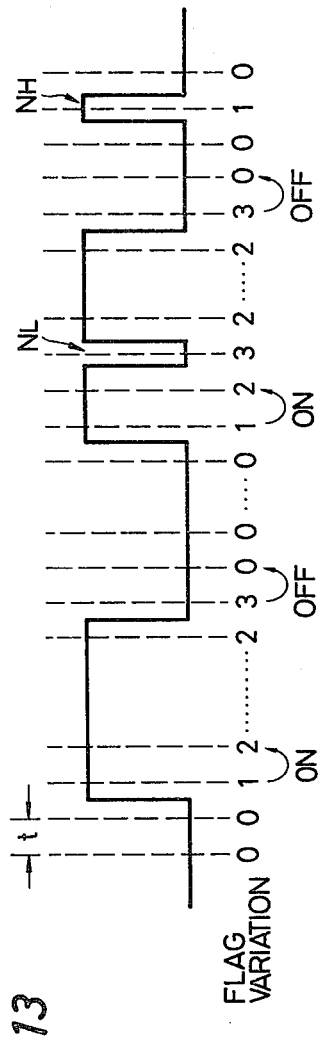
FIG. 13 is a diagram showing the relationship between the value of the flag and the movement detection pulses according to the detecting method shown in FIG. 12.

Therefore, in the case that a movement detection pulse as shown in FIG. 13 is input to the microcomputer 1, detection of the level thereof is effected at a period "t", and the value of the flag obtained by the flowchart of FIG. 12 vary as shown below the waveform of the diagram. As shown in FIG. 13, a low level noise $N_L$ and a high level noise $H_H$ do not continuously occur for a period greater than "2t", and usually occur for a time period less than "t", and therefore, false detection of rising and falling edges is hardly caused by the noise $N_L$ or $N_H$. In this way, the edges of the movement detection pulses can be accurately detected without malfunction, while a count accurately corresponding to the actually moved position of the pickup arm 3 can be obtained.

Figure 14:
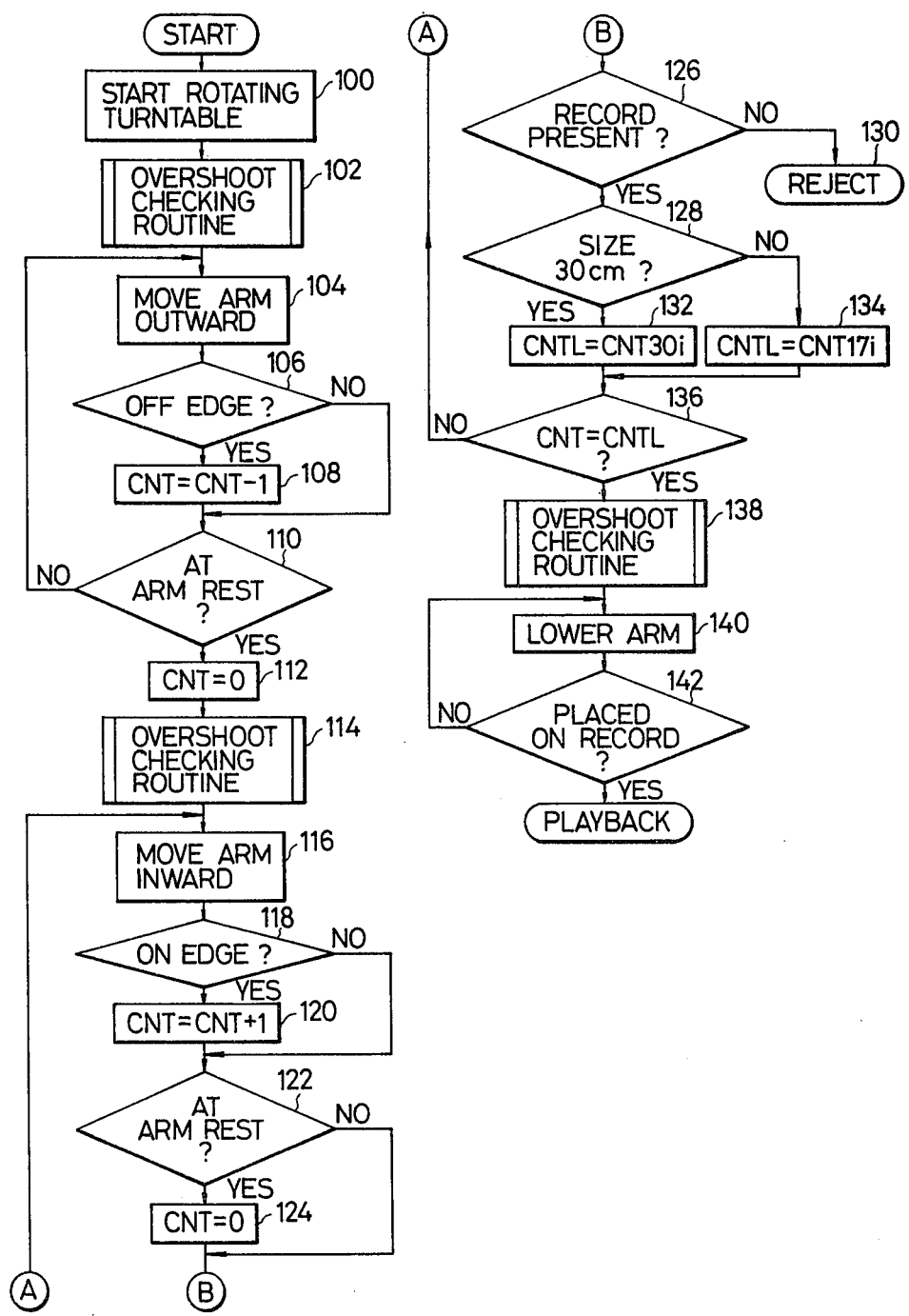
FIG. 14 is a flowchart showing the main routine of the microcomputer of FIG. 4.

Referring now to FIGS. 14 and 15 showing the operational flowcharts of the microcomputer 1 of FIG. 4, further detailed operation of the microcomputer 1 will be described taking an example of a case of moving the pickup arm 3 from the arm rest to the lead-in position. FIG. 14 is a flowchart of the main routine, and FIG. 15 is a flowchart of an overshoot checking routine included in the main routine. In a first step 100 of the main routine of FIG. 14, the turntable drive motor (not shown) is energized in response to a start signal from the key switch 2. Then the overshoot checking routine takes place in which the pickup arm 3 is lifted up if the pickup arm is in lowered position. In this overshoot checking routine, a timer within the microcomputer 1 is set to a predetermined period of time so that counting is of the movement detection pulses is effected for this predetermined period of time as will be described with reference to FIG. 15. After the overshoot checking routine, step 104 is executed to produce a drive signal which will be fed to the pickup arm drive motor 9 to move the pickup arm outward. In a following step 106, it is detected if the movement detection pulses indicate an off edge. If the answer of step 106 is YES, the count of the counter, which counts the number of the movement detection pulses, is decreased by one. After step 108 or when the answer of the step 106 is NO, a step 110 takes place in which it is detected whether the pickup arm 3 is at the arm rest. If the answer of this step is NO, the operational flow returns to the step 104. On the other hand, if the answer of this step 110 is YES, the counter is reset to zero in a step 112, and then the overshoot checking routine is again executed in step 114. Subsequently, a step 116 takes place to produce a drive signal which will bed to the pickup arm drive motor 9 to move the pickup arm inward. Then in a step 118, it is detected if the movement detection pulses indicate an on edge. If the answer of this step 118 is YES, the count is increased by one in a step 120. After this step 120 or when the answer of the step 118 is NO, a step 122 takes place in which it is detected whether the pickup arm 3 is at the arm rest. If the answer of this step 122 is YES, a step 124 takes place in which the counter is reset to zero. After the step 124 or when the answer of the step 122 is NO, a step 126 is executed to detect whether a disc record is placed on the turntable or not. If the answer of step 126 is NO, namely, if no disc record is on the turntable, the pickup arm 3 is returned to the arm rest for rejection. If the answer of the step 126 is YES, the size of the record is detected in a step 128. Namely, if the size is 30 cm, the answer becomes YES to execute a step 132, and on the other hand, if the size is not 30 cm, the answer becomes NO to execute a step 134. In the steps 132 and 134, predetermined values respectively corresponding to the lead-in position of 30 cm disc records and 17 cm disc record are respectively set in the counter. Then in a step 136, it is detected whether the count CNT of the counter equals the preset value of the register. If the answer of the step 136 is NO, the operational flow returns to the step 116 and the steps 116 to 126 and 128 to 136 are repeatedly performed until the answer of the step 136 becomes YES. After the answer of the step 136 becomes YES, a step 138 takes place to execute the above-mentioned overshoot checking routine. Then in a step 140, the pickup arm 3 is lowered. In a following step 142, it is detected if the reproduce stylus has reached the surface of the disc record or not. If the answer of the step 142 is NO, the step 140 takes place again until the answer becomes YES. When the answer of the step 142 becomes YES, namely, when the reproduce stylus is placed on the surface of the disc record, then playback is started.

The overshoot checking routine of the steps 102, 114 and 138 is executed as shown in FIG. 5. Namely, at a first step 200, the timer is set to the predetermined period of time T. Then in a step 202, the moving direction of the pickup arm is detected from the polarity of the driving signal fed from the microcomputer 1 to the pickup arm drive motor 9, and a register DiR is set to L when the pickup arm 3 is being moved inward or to R when the pickup arm 3 is being moved outward. After the step 202, the pickup arm drive motor 9 is deenergized and the plunger 4 of FIG. 8 is energized to lift up the pickup arm 3. However, the pickup arm drive motor 9 does not immediately stop as described hereinabove, and the movement detection pulses are processed to accurately detect the position of the pickup arm 3 in the following steps. In a step 206, it is detected whether the movement detection pulses indicates an on edge or not. If the answer of this step 206 is YES, then it is detected in a step 208 if the register Dir is set to L (inward movement). IF the answer of the step 208 is YES, the count CNT of the counter is increased by one in a step 210. After the step 210 or when the answer of the step 206 or 208 is NO, a step 212 takes place to detect if the movement detection pulses indicate an off edge. If the answer of this step 212 is YES, then it is detected in a step 214 if the register Dir is set to R (outward movement). IF the answer of the step 214 is YES, the count CNT of the counter is decreased by one in a step 216. Subsequently, in a step 218 it is detected whether the predetermined period of time T set in the timer has elapsed or not. The steps 204 to 218 are repeated until the answer of the step 218 becomes YES. When the answer of the step 218 becomes YES, namely, when the predetermined period of time T has passed, the overshoot checking routine is completed.

As described in the above, in the present invention, since the counting means is arranged such that the movement detection pulses produced in a predetermined period of time after the instant of manipulation for stopping the movement of the pickup arm are counted for the predetermined period of time in the same counting direction as the counting direction at the time of movement of the pickup arm, which is immediately before the manipulation for stopping, it is possible to obtain a count corresponding to the actually moved position of the pickup arm by absorbing overshoot (overrun), which occurs due to inertia of the motor for moving the pickup arm, without requiring expensive parts or additional circuits, while there is no need of adjustment. Furthermore, since a stop signal for stopping the movement of the pickup arm is output for a predetermined period of time after the instant of manipulation for inverting the moving direction of the pickup arm, and the movement detection pulses are counted in the same counting direction as the counting direction at the time of moving the pickup arm which is immediately before the instant of manipulation for inversion, and the pickup arm is inversely moved thereafter in accordance with the manipulation for inversion, overshoot can be satisfactorily absorbed on manipulation for inversion. Furthermore, the above-mentioned counting means is arranged such that it counts the movement detection pulses by detecting one edge of each pulse, where the other edge is detected after the predetermined period of time passed from the time of the above-mentioned manipulation for inversion, and therefore, a count corresponding to the moved position of the pickup arm can be always obtained, aborbing overshoot to control the movement of the pickup smoothly, while easy and accurate manipulation for a full automatic record player is not deteriorated. Furthermore, since the above-mentioned movement detection pulses are detected as a rising edge or a falling edge only when two or more edges are repeatedly detected as of the same level, movement control of the pickup can be accurately performed in accurate correspondence with the amount of the movement of the pickup arm without malfunction irrespective of noises.

The above-described embodiments are just examples of the present invention, and therefore, it will be apparent for those skilled in the art that many modifications and variations may be made without departing from the spirit of the present invention.

What is claimed is:

1. A pickup arm control device for a record player comprising:
    (a) a pickup drive motor for moving a pickup arm of said record player in inward and outward directions with respect to a turntable of said record player;
    (b) first means for producing a pulse train signal indicative of the moving amount of said pickup arm; and
    (c) second means for energizing said pickup arm drive motor in response to a first command signal, the rotating direction of said pickup arm drive motor being determined by the polarity of said first command signal; for detecting the moving direction of said pickup arm from the polarity of said first command signal; for counting the number of said pulses in such a manner that additive counting is effected when said pickup arm is moving in a given direction and subtractive counting is effected when said pickup arm is moving in a direction opposite to said given direction; for detecting a second command signal, with which said pickup arm drive motor is to be stopped or inversely rotated; for deenergizing said pickup drive motor in response to said second command signal; and for continuously counting the number of said pulses for a predetermined period of time after the instant, at which said pickup arm drive motor is deenergized, in the same direction as before.

2. A pickup control device as claimed in claim 1, wherein said second means is arranged to detect said pulses in response to the rising edges of said pulses when said pickup arm is being moved in one direction, and in response to the falling edges when said pickup arm is being moved in the other direction.

3. A pickup control device as claimed in claim 1, wherein said first means comprises a photoelectrical detector combined with a toothed disc which rotates in synchronizm with said pickup arm drive motor.

4. A pickup arm control device as claimed in claim 1, wherein said second means comprises a microcomputer.

5. A pickup arm control device as claimed in claim 1, further comprising a record size and record presence/absence detector.

6. A method of controlling a pickup arm of a record player comprising the steps of:
    (a) producing a pulse train signal indicative of the moving amount of said pickup arm which is arranged to move in inward and outward directions with respect to a turntable of said record player by means of a pickup drive motor;
    (b) energizing said pickup arm drive motor in response to a first command signal, the rotating direction of said pickup arm drive motor being determined by the polarity of said first command signal;

(c) detecting the moving direction of said pickup arm from the polarity of said first command signal;

(d) counting the number of said pulses in such a manner that additive counting is effected when said pickup arm is moving in a given direction and subtractive counting is effected when said pickup arm is moving in a direction opposite to said given direction;

(e) detecting a second command signal, with which said pickup arm drive motor is to be stopped or inversely rotated;

(f) deenergizing said pickup drive motor in response to said second command signal; and (g) continuously counting the number of said pulses for a predetermined period of time after the instant, at which said pickup arm drive motor is deenergized, in the same direction as before.

7. A method as claimed in claim 6, further comprising a step of energizing said pickup drive motor after said predetermined period of time has passed so that said pickup arm is moved in an opposite direction in response to said second command signal with which said pickup arm drive motor is inversely rotated.

8. A method as claimed in claim 6, wherein said step of detecting said pulses is performed by detecting the rising edges of said pulses when said pickup arm is being moved in one direction, and by detecting the falling edges when said pickup arm is being moved in the other direction.

* * * * *